United States Patent
Robert et al.

(10) Patent No.: US 11,920,034 B2
(45) Date of Patent: Mar. 5, 2024

(54) POLYAMIDE COMPOSITION CONTAINING FLAT GLASS FIBRES (B) WITH IMPROVED FATIGUE RESISTANCE

(71) Applicant: BASF SE, Ludwigshafen am Rhein (DE)

(72) Inventors: Gilles Robert, Craponne (FR); Tae-Kyun Kim, Gyeonggi-do (KR); Weibing Wang, Lyons (FR); Franco Speroni, Ceriano Laghetto (IT)

(73) Assignee: BASF SE, Ludwigshafen am Rhein (DE)

( * ) Notice: Subject to any disclaimer, the term of this patent is extended or adjusted under 35 U.S.C. 154(b) by 358 days.

(21) Appl. No.: 17/287,957

(22) PCT Filed: Oct. 22, 2019

(86) PCT No.: PCT/EP2019/078709
§ 371 (c)(1),
(2) Date: Apr. 22, 2021

(87) PCT Pub. No.: WO2020/083901
PCT Pub. Date: Apr. 30, 2020

(65) Prior Publication Data
US 2021/0371652 A1    Dec. 2, 2021

(30) Foreign Application Priority Data
Oct. 22, 2018    (EP) .................... 18306379

(51) Int. Cl.
| C08L 77/02 | (2006.01) |
| B29C 45/00 | (2006.01) |
| C08K 3/40 | (2006.01) |
| C08K 7/14 | (2006.01) |
| B29K 77/00 | (2006.01) |
| B29K 309/08 | (2006.01) |

(52) U.S. Cl.
CPC .......... *C08L 77/02* (2013.01); *B29C 45/0001* (2013.01); *B29C 45/0005* (2013.01); *C08K 3/40* (2013.01); *C08K 7/14* (2013.01); *B29K 2077/00* (2013.01); *B29K 2309/08* (2013.01); *C08K 2201/004* (2013.01)

(58) Field of Classification Search
CPC ......... C08K 3/40; C08K 7/14; C08L 2666/66; C08L 2666/73
See application file for complete search history.

(56) References Cited

U.S. PATENT DOCUMENTS

| 8,586,662 B2 | 11/2013 | Harder et al. |
| 10,808,122 B2 | 10/2020 | Theodorus et al. |
| 2003/0092822 A1 | 5/2003 | Joachimi et al. |
| 2008/0167415 A1 | 7/2008 | Stoeppelmann et al. |
| 2017/0130049 A1* | 5/2017 | Park .................. C08K 7/14 |

FOREIGN PATENT DOCUMENTS

| CN | 101861357 A | 10/2010 |
| EP | 1292641 B1 | 10/2007 |
| JP | 2011174608 A | 9/2011 |
| JP | 2016098240 A * | 5/2016 |
| WO | 2012156227 A2 | 11/2012 |
| WO | WO 2019/122142 A1 * | 6/2019 |

OTHER PUBLICATIONS

JP 2016098240 A machine translation (May 2016).*
International Search Report and Written Opinion for corresponding International Application No. PCT/EP2019/078709, dated Feb. 4, 2020, 10 pages.

* cited by examiner

*Primary Examiner* — Ana L. Woodward
(74) *Attorney, Agent, or Firm* — Armstrong Teasdale LLP

(57) ABSTRACT

Described herein is a polyamide composition (P) including specific flat glass fibres (B) with elongated shape having a non-circular cross-sectional area. The polyamide composition (P) is advantageously used for the production of molded parts. Also described herein is a method of using molded parts obtainable by molding of the polyamide composition (P) to produce mechanical parts. The molded parts are characterized by having improved fatigue resistance properties. Also described herein is a polyamide composition (P) including PA 6.6 as polyamide (A) and flat glass fibres (B).

14 Claims, 4 Drawing Sheets

POLYAMIDE COMPOSITION CONTAINING FLAT GLASS FIBRES (B) WITH IMPROVED FATIGUE RESISTANCE

CROSS-REFERENCE TO RELATED APPLICATIONS

This application is a U.S. National Phase Application of International Patent Application No. PCT/EP2019/078709, filed Oct. 22, 2019, which claims the benefit of priority to European Patent Application No. 18306379.1, filed Oct. 22, 2018, the entire contents of which are hereby incorporated by reference herein.

The present invention relates to polyamide compositions comprising at least one polyamide and at least one flat glass fibres as reinforcing filler.

BACKGROUND OF THE INVENTION

Polyamide compositions are frequently used for technical construction materials since they exhibit good toughness, rigidity and heat resistance, i.e., high performance retention of mechanical properties such as tensile strength (TS) to break and Charpy impact strength after thermal aging, high heat distortion temperature (HDT) and minimum distortion during injection molding. Areas of application of these polyamide compositions include, for example, interior and exterior parts in the automotive sector and in the area of other transport means, housing materials for appliances and equipment for telecommunications, entertainment electronics, household appliances, mechanical engineering equipment, and equipment in the heating field and fasting parts for installations.

In order to exhibit the excellent mechanical properties, i.e. high rigidity and excellent toughness in addition to good heat resistance, the polyamide compositions comprise in addition to the polyamide resins reinforcing fillers, such as glass fibres (GF).

Fatigue resistance is an important property of short glass fibres reinforced polyamide compositions for numerous applications in automotive, electric and electronic (E/E), consumer and industrial goods. Glass fibre reinforced polyamide compositions can be shaped into parts by injection molding, extrusion, blow molding etc. Examples of applications where good fatigue resistance is required (under variable solicitations including pulsating pressure) are: engine mounts, turbo chargers, automotive air, coolant and oil circuits, or pumps, water meters, sport devices, etc.

However, in polyamide compositions fatigue resistance is typically reduced by plasticization due to moisture absorption and by temperature increase. For this reason, improving fatigue resistance behavior of polyamide compositions is a key issue. Today, this problem is typically approached by the addition of higher amounts of glass fibres to the polyamide compositions or by modifying the chemical nature of the polyamide resin.

The glass fibres used in the polyamide compositions may have a circular cross-section, also called standard (normal, round) glass fibres, as described for example in US 2007/0117910 or US 2014/0275367, or a non-circular cross-section, and in particular as flat glass fibres.

The flat glass fibres can be used to reinforce a polyamide composition in place of standard glass fibres having a circular cross-section, since flat glass fibres having a cross-section whose major axis and minor axis have different values enable higher packing density at high degrees of reinforcement, resulting in higher flexural modulus, higher mechanical strength, especially along the direction of the fibre, and thus improve mechanical strengths and dimensional stability of the articles produced using the polyamide composition due to said geometrical advantages than the standard glass fibres.

The glass fibres have to be incorporated into the polyamide composition in a sufficient amount in order to meet the mechanical requirements as mentioned above.

US 2016/0053091 provides a polyamide resin composition reinforced with glass fibre which can produce a molded product having high anti-vibration property or, in other words, having very high resonance frequency and having, upon necessity, excellent weather-resisting color fastness. A polyamide resin composition reinforced with glass fibre, comprising a polyamide resin (A) constituted from aliphatic polyamide (a1) and aromatic component-containing polyamide (a2), and glass fibres (B) having a cross-sectional area of 1.5 to $5.0 \times 10^{-6}$ cm$^2$, wherein ratio by weight of the polyamide resin (A) to the glass fibres (B) [(A):(B)] is from 20:80 to 35:65 and ratio by weight of the aliphatic polyamide (a1) to the aromatic component-containing polyamide (a2) [(a1):(a2)] is from 5:95 to 95:5. The polyamide resin composition reinforced with glass fibres can further comprise carbon black (C) in an amount of at most 5% by weight.

US 2015/0291795 relates to a polyamide molding composition which comprises an amorphous polyamide, a partially crystalline, aliphatic polyamide and glass fibres for reinforcement. Furthermore, the polyamide molding composition according to the invention comprises a polyamide made of a cycloaliphatic diamine and a dimerized fatty acid. The polyamide molding compositions are used in the production of electrical or electronic components, housings or housing components.

US 2011/0240930 discloses reinforced polyamide molding materials comprising: (A) 0 to 60 wt.-% of at least one aliphatic, partly crystalline polyamide with a solution viscosity of $\eta_{rel}$ less than 1.9, (B) 0 to 60 wt.-% of at least one amorphous or microcrystalline polyamide, wherein the components (A) and (B) fulfill the condition: (A)+(B)=20 to 60 wt.-% and that, in the case of a mixture of components (A) and (B), at least 50 weight parts aliphatic blocks (A) are present in the mixture, and a filler component, comprising: (C) 40 to 80 wt.-% flat glass fibres with elongated shape, and the glass fibres have a non-circular cross-sectional area and a size ratio of the main cross-sectional axis to the secondary cross-sectional axis of between 2 to 5, particularly between 3 and 4. Average glass fibre lengths in the molding material of 350 μm are reported.

EP 0 246 620 relates to a glass-fibre reinforced resin molded part which comprises a thermoplastic resin reinforced with glass fibres having elongated non-circular cross-section. The thermoplastic resins usable include PP (polypropylene), AS (acrylonitrile-styrene), ABS (acrylonitrile-butadiene-styrene), PBT (polybutylene terephthalate), PET (polyethylene terephthalate), PA (polyamide), PC (polycarbonate), POM (polyacetal), PPO (polyphenylene oxide), PPS (polyphenylene sulphide), PES (polyethersulphone), PEEK (polyetheretherketone). The glass fibre is preferably present in the composition from 10 to 70 wt.-% and has an aspect ratio (=length of major axis/length minor axis of the elongated non-circular cross-section) of 1.5 to 10. It is reported that the use of glass fibres having elongated non-circular cross-section allows to increase mechanical strength of the molded part by increasing the glass fibre content. The glass fibre length is determined as volume-average length.

SUMMARY OF THE INVENTION

The invention relates a polyamide composition (P) for the production of molded parts, wherein the polyamide composition (P) comprises (or consists of):

(a) 25 to 85 wt.-%, preferably 30 to 80 wt.-%, more preferably 30 to 75 wt.-%, and in particular 35 to 70 wt.-%, based on the total weight of the polyamide composition (P), of at least one polyamide (A);

(b) 15 to 75 wt.-%, preferably 20 to 70 wt.-%, more preferably 25 to 70 wt.-%, and in particular 30 to 65 wt.-%, based on the total weight of the polyamide composition (P), of at least one flat glass fibre (B) with elongated shape having a non-circular cross-sectional area;

(c) 0 to 30 wt.-%, based on the total weight of the polyamide composition (P), of at least one reinforcement agent (C) different from the flat glass fibre (B), (d) 0 to 30 wt.-%, based on the total weight of the polyamide composition (P), of at least one additive (D);

wherein
the at least one polyamide has a viscosity number (VN) in the range of from 80 to 200 mL/g, preferably 85 to 160 mL/g;
the at least one flat glass fibre (B) as comprised in the final polyamide composition (P) is defined by the following parameter:

(i) the aspect ratio of the length of the main cross-sectional axis w to the length of the secondary cross-sectional axis d of the non-circular cross-sectional area of the flat glass fibre (B) is from 1.5 to 10, preferably from >3 to 10;

(ii) the average length $L_z$ of the flat glass fibre (B), defined by the following formula (1), has a minimum value of 400 μm, preferably 450 μm, and preferably a maximum value of 700 μm:

$$L_z = \Sigma_{i=1}^{n}(L_i)^3 n_i / \Sigma_{i=1}^{n}(L_i)^2 n_i \quad (1),$$

wherein:
$L_i$ is the length of the largest dimension in one of the spatial directions of a fraction of the flat glass fibre (B) in the final polyamide composition (P),
$n_i$ is the number of flat glass fibres (B) having the length $L_i$,
n is the total number of flat glass fibres (B), and
i is an integer from 1 to ∞; and (iii) the ratio between the average longest dimension $L_n$, defined by the following formula (2), of the flat glass fibre (B) and the average shortest dimension d of the flat glass fibre (B) is $$\frac{L_n}{d} \geq 40,$$

in particular ≥45:

$$L_n = \Sigma_{i=1}^{n} L_i n_i / \Sigma_{i=1}^{n} n_i \quad (2),$$

wherein:
$L_i$ is the length of the largest dimension in one of the spatial directions of a fraction of the flat glass fibre (B) in the final polyamide composition (P),
$n_i$ is the number of flat glass fibres (B) having the length $L_i$,
n is the total number of flat glass fibres (B),
i is an integer from 1 to ∞, and
d is the length of the shortest dimension in one of the spatial directions of a fraction of the flat glass fibre (B).

It was surprisingly found by the present inventors that the polyamide composition (P) according to the present invention can be advantageously used for the production of molded parts which exhibit improved fatigue resistance properties. Thus, in one preferred aspect, the invention relates to the use of the polyamide composition (P) as described above, in particular for the production of molded parts, wherein the molded parts are submitted to oscillatory loadings of variable amplitude, variable frequency, variable pressure loadings and/or variable temperature in different moisture conditions during its use.

It was surprisingly found that the use of flat glass fibres (B) in polyamide compositions (P) allows to significantly increase the fatigue resistance of polyamide compositions (P) at equal glass fibre contents, i.e. without the need of increasing the glass fibre loading or to modify the nature of the polyamide (A). Moreover, the improvement in fatigue resistance is largely independent from the orientation of the flat glass fibres (B) in the molded part, which allows designers to have better optimization of mechanical properties of the final part.

DETAILED DESCRIPTION OF THE INVENTION

Figure 1:
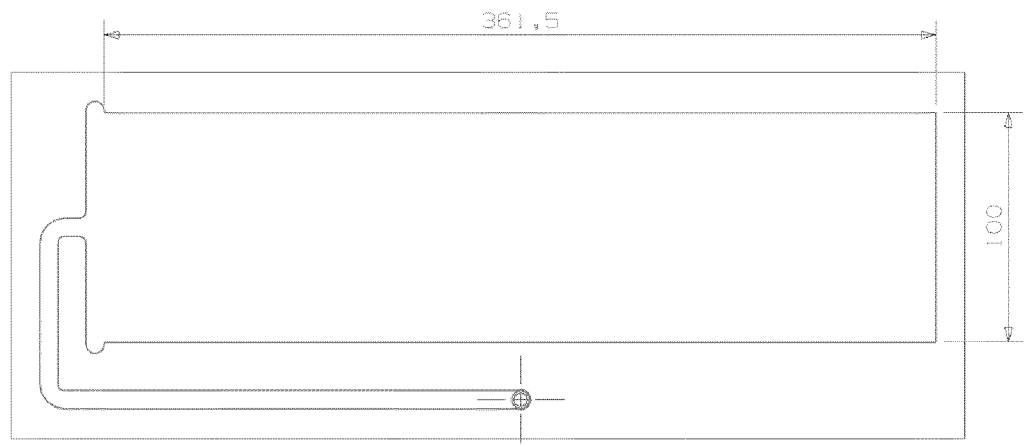
FIG. 1 depicts the plaque geometry, gates and runners used for the preparation of the test specimen of the example and comparative examples reported herein.

In the present document, the following definitions apply:

In general, polyamides are to be understood as meaning polymers which are derived from dicarboxylic acids, diamines, aminocarboxylic acids and/or lactams. They may be homo- or copolymers, as well as polymer blends, i.e. mixtures of at least two different polyamides.

The meaning of the term "semi-crystalline polyamide" is known to a person skilled in the art. Usually, the term is intended to denote a polyamide comprising a crystallizable and an amorphous portion in the skeleton, i.e., an amorphous polymeric material which contains randomly entangled chains and a crystalline material which contains domains in which the polymer chains are packed in an ordered array, where these crystalline domains are embedded in an amorphous polymer matrix portion. In particular, the semi-crystalline polyamide in the solid state contains a fraction of regularly organized, crystalline polymeric domains in which polymer chains are packed in an ordered array (e.g. lamellae, spherulites). Crystalline domains coexist with a fraction of amorphous, non-crystallized polymer domains. The semi-crystalline fraction shows a melting and a crystallization point range, and a melting and a crystallization enthalpy as well. Such values can be easily detected by experts in the field, e.g. by DSC analysis. The amorphous phase does not show any melting or crystallization point or enthalpy.

As used herein, the singular forms "a", "an", and "the" include both singular and plural referents unless the context clearly dictates otherwise. By way of example, "an additive" means one additive or more than one additive.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

As used herein, the terms "% by weight", "wt.-%", "weight percentage", or "percentage by weight" are used interchangeably.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

In the following passages, different alternatives, embodiments and variants of the invention are defined in more detail. Each alternative and embodiment so defined may be combined with any other alternative and embodiment, and this for each variant unless clearly indicated to the contrary or clearly incompatible when the value range of a same parameter is disjoined. In particular, any feature indicated as being preferred or advantageous may be combined with any other feature or features indicated as being preferred or advantageous.

Furthermore, the particular features, structures or characteristics described in present description may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

According to the present invention, the polyamide composition (P) comprises 25 wt.-% to 85 wt.-%, based on the total weight of the polyamide composition (P), of at least one polyamide (A). Preferably, the polyamide composition (P) comprises 30 to 80 wt.-%, more preferably 30 to 75 wt.-%, more preferably 35 to 70 wt.-%, based on the total weight of polyamide composition (P), of the polyamide (A).

The polyamide (A) has a viscosity number (VN) measured according to ISO 307 of 80 to 200 mL/g, 82 to 180 mug, more preferably of 85 to 160 ml/g, even more preferably of 86 to 140 ml/g, and in particular of 87 to 130 ml/g. The standard measurement ISO 307 method determines viscosity number of a polyamide as a 0.005 g/ml solution in 90 wt.-% of formic acid at 25° C.

The at least one polyamide (A) can include homo- and/or copolymers derived from aliphatic, cycloaliphatic and/or aromatic dicarboxylic acids, diamines, aminocarboxylic acids and/or lactams. The at least one polyamide can be crystalline, semi-crystalline or amorph. The polyamide composition (P) according to the invention may comprise only one polyamide (A) or a blend of at least two polyamides (A). In one preferred embodiment, the polyamide composition (P) comprises only one polyamide (A). In an alternative preferred embodiment, the polyamide composition (P) comprises at least two different polyamides (A)

The polyamide (A) can be obtained e.g. through melt polycondensation reaction of at least one dicarboxylic acid and at least one diamine in stoichiometric polyamide composition (P). Alternatively, a salt of the dicarboxylic acid and the diamine can be prepared as a first step then fed into a polycondensation equipment to obtain the polyamide (A), according one of technologies well known by men of art (e.g. as described in Nylon Plastics Handbook, edited by Melvin Kohan, Hanser Verlag, 1995).

In one embodiment of the invention, the at least one polyamide (A) can include homopolymers derived from aliphatic dicarboxylic acids and aliphatic diamines. Alternatively, a salt of the aliphatic dicarboxylic acid and the aliphatic diamine can be used for the preparation.

In an alternative embodiment of the invention, the at least one polyamide (A) can include homopolymers derived from aromatic dicarboxylic acids and aliphatic diamines. Alternatively, a salt of the aromatic dicarboxylic acid and the aliphatic diamine can be used for the preparation.

In a further alternative embodiment of the invention, the at least one polyamide (A) can include homopolymers derived from cycloaliphatic dicarboxylic acids and aliphatic diamines. Alternatively, a salt of the cycloaliphatic dicarboxylic acid and the aliphatic diamine can be used for the preparation.

In one embodiment of the invention, the at least one polyamide (A) can include an amorph or semi-crystalline polyamide. In a preferred embodiment, the polyamide (A) includes at least one semi-crystalline polyamide.

In one embodiment of the invention, the at least one polyamide (A) can include an aliphatic or semi-aromatic, semi-crystalline polyamide. In a preferred embodiment, the polyamide (A) includes at least one aliphatic, semi-crystalline polyamide.

Mention may be made, as an example of a polyamide (A) which may be suitable for the invention, of polyamide 6; polyamide 6.6, polyamide 11, polyamide 12, polyamide 4.6; polyamide 6.10; polyamide 6.12; polyamide 10.10, polyamide 10.12, polyamide 12.12 and 6.36; semi-aromatic polyamides including polyamides obtained from xylylene diamines such as meta-xylylene diamine (MXD), in particular polyamide MXD.6 and polyamide MXD.10, polyphthalamides obtained from terephthalic and/or isophthalic acid, such as copolyamide 6.6/6.T, polyamide 4/T and copolymers, polyamide 9.T, copolyamide 6.I/6.T, copolyamides containing terephthalic acid and methyl-pentamethylenediamine (MPMD), such as polyamide MPMD/T and polyamide 6.T/MPMD/T and their copolymers and alloys.

According to one embodiment of the invention, the polyamide is chosen from polyamide 6, polyamide 6.6, and their copolymers or blends with themselves or with other polyamides. Thus, in this embodiment of the invention, the polyamide (A) comprises at least one polyamide selected from polyamide 6 and polyamide 6.6. In one preferred embodiment of the invention, the polyamide (A) comprises at least polyamide 6.6. In an alternative preferred embodiment of the invention, the polyamide (A) comprises at least polyamide 6.6 and at least one semi-aromatic polyamide, in particular copolyamide 6.6/6.T.

In a particular preferred embodiment, the polyamide composition (P) according to the present invention comprises polyamide 6 and/or polyamide 6.6 (PA 6.6), in particular polyamide 6.6, in an amount of 30 to 85 wt.-%, based on the total weight of the polyamide composition (P), and preferably comprises no other polyamide than PA 6.6

In an alternative preferred embodiment, the polyamide composition (P) according to the present invention comprises polyamide 6 and/or polyamide 6.6 (PA 6.6), in particular polyamide 6.6, in an amount of 30 to 80 wt.-%, based on the total weight of the polyamide composition (P), and up to 5 wt.-% of at least one semi-aromatic polyamide, in particular up to 5 wt.-% of PA 6.6/6.T.

The melting point of the polyamide (A) may be measured by any known method, in particular by ASTM D 3418, i.e. by differential scanning calorimetry (DSC). The polyamide (A) has preferably a melting point of 300° C. or lower, more preferably the melting point is in a range of from 200 to 300° C., more preferably in a range of from 220 to 290° C., more preferably in a range of from 250° C. to 285° C.

In order to exhibit excellent fatigue resistance properties, the polyamide composition (P) additionally comprises 15 to 75 wt.-% of flat glass fibres (B) as reinforcing filler. In the present invention, the term "flat glass fibres (B)" is intended to denote glass fibres having a non-circular cross-section. Flat glass fibres (B) suitable for being used as reinforcing filler in the polyamide composition (P) of the present invention may have any non-circular cross-section such as an elliptical section, oblong-circular section, rectangle section, a section in which half rounds are connected to both short sides of a rectangle, and cocoon section.

Figure 4:
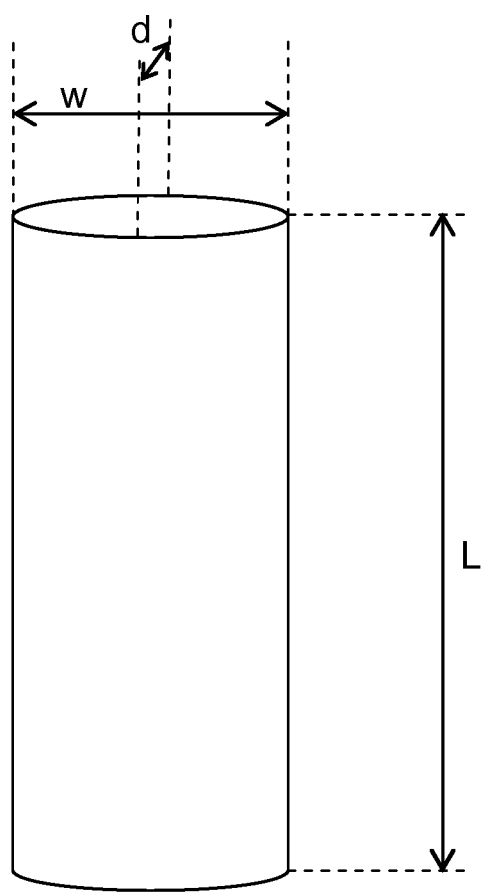
FIG. 4 depicts the dimensions of the flat glass fibres (B), exemplified by a flat glass fibre (B) having an elliptical cross-section. Each flat glass fibre (B) has a certain length L. L represents the length of the largest dimension in one of the spatial directions of a fraction of each flat glass fibre (B). The length L of the flat glass fibre (B) as comprised in the final polyamide composition (P) is determined by different aspects, including its fibre length at the beginning of the compounding process, the type and amount of glass fibres, the type and design of the mixing device (e.g. by the extruder screw profile if an extruder is used) and by the processing conditions. Each flat glass fibre (B) has a cross-section which is characterized by its main cross-sectional axis w and its secondary cross-sectional axis d. Typically, the main cross-sectional axis w is larger or equal to the secondary cross-sectional axis d, and L≥w≥d. The main cross-sectional axis w represents the length of the largest dimension of the cross-section of the flat glass fibre (B). The secondary cross-sectional axis d represents the length of the shortest dimension in one of the spatial directions of a fraction of the flat glass fibre (B). The length of the main cross-sectional axis w and the length of the secondary cross-sectional axis d is typically not affected by the compounding processes.

Flat glass fibres (B) are characterized by having a non-circular cross-section which exhibits a main cross-sectional axis w and a secondary cross-sectional axis d, as exemplified for a flat glass fibre (B) having an elliptical cross-section in FIG. 4. The main cross-sectional axis w represents the length of the largest dimension of the cross-section of the flat glass fibre (B). The secondary cross-sectional axis d represents the length of the shortest dimension in one of the spatial directions of a fraction of the flat glass fibre (B). The length of the main cross-sectional axis w and length of the secondary cross-sectional axis d is typically substantially not affected by the compounding processes for the preparation of the polyamide composition (P). Thus, within the present invention, references to the length of the main cross-sectional axis w and the length of the secondary cross-sectional axis d refer to length of the main cross-sectional axis w and the length of the secondary cross-sectional axis d of the starting material flat glass fibres (B) which are typically determined by the spinning processes used for preparation of the glass fibre and vary only in a limited extend. Preferably, reference is made to the number-average values for the length of the main cross-sectional axis w and the secondary cross-sectional axis d, unless otherwise indicated. By contrast, the length L of the flat glass fibre (B) is significantly affected by the compounding process and the references to the fibre length L and the fibre length distribution refer to the glass fibres (B) as comprised in the final polyamide composition, as discussed in further detail below.

Typically, the main cross-sectional axis w is larger or equal to the secondary cross-sectional axis d. The aspect ratio (=length of main cross-sectional axis w/length of the secondary cross-sectional axis d) of said non-circular cross-section of the flat glass fibres (B) is in general from 1.5 to 10, for example from 1.5 to 7.0, or from 2.5 to 5.5, or from 2.0 to 6.0, or from 3.0 to 5.0, advantageously from >3 to 10, preferably from >3 to 7, more preferably from 3.5 to 7, even more preferably from 3.5 to 6, in particular from 3.5 to 5 and most preferably from 3.5 to 4.5.

The flat glass fibre (B) is further characterized by the average fibre length $L_z$ as comprised in the final polyamide composition (P). Flat glass fibres (B) can be used to produce polyamide compositions (P) in accordance with the present invention in form of continuous roving bundles or in form of chopped strands, whose length is typically from 3 to 10 mm prior to processing with the further constituent (A), and optionally (C) and/or (D) in order to obtain the polyamide composition (P). Once the flat glass fibres (B) and the further constituent (A), and optionally (C) and/or (D), are introduced to a mixing device, e.g. an extruder, the flat glass fibres (B) break into shorter fibres with a given length distribution determined by the type and amount of glass fibres, the starting length of the glass fibres, the type and design of the mixing device (e.g. by the extruder screw profile if an extruder is used) and by the processing conditions. Unless otherwise noted, the structural parameters given with respect to the flat glass fibres (B) herein thus refer to the flat glass fibres (B) as comprised in the final polyamide composition (P), i.e. after processing of the constituents (A), (B), and optionally (C) and/or (D), in a mixing device in order to obtain the polyamide composition (P) is carried out.

The average length $L_z$ of the flat glass fibre (B) as comprised in the final polyamide composition (P) has a minimum value of 400 μm, preferably at least 450 μm, and in particular at least 500 μm, and a maximum value of 700 μm, preferably 650 μm, and in particular 600 μm. The average length $L_z$ according to the present invention can be determined by the measurement of the length of a significative number of flat glass fibres (B) present inside the polyamide matrix. This can be done e.g. through the separation of flat glass fibres from the polyamide matrix (e.g. by known techniques such as dissolution, hydrolysis or pyrolysis of the polyamide matrix, followed by the separation and recovery of a significative sample of residual single flat fibres). The determination of the length of a single flat glass fibre (B) (i.e. $L_i$) may carried out e.g. by image analysis techniques applied to optical microscopy or to scanning electron microscopy (SEM). The average length $L_z$ is obtained by calculating the observed values according to the following formula (1):

$$L_z = \Sigma_{i=1}^{n}(L_i)^3 n_i / \Sigma_{i=1}^{n}(L_i)^2 n_i \quad (1),$$

wherein:
$L_i$ is the length of the largest dimension in one of the spatial directions of a fraction of the flat glass fibre (B) in the final polyamide composition (P),
$n_i$ is the number of flat glass fibres (B) having the length $L_i$,
n is the total number of flat glass fibres (B), and
i is an integer from 1 to ∞.

The ratio between the average longest dimension L of the flat glass fibre (B) and the average shortest dimension d of the flat glass fibre (B) is $$\frac{L_n}{d} \geq 40,$$

preferably ≥45, and in particular ≥50, and preferably ≤700, in particular ≤600 μm. The longest dimension $L_n$ is defined by the following formula (2):

$$L_n = \Sigma_{i=1}^{n} L_i n_i / \Sigma_{i=1}^{n} n_i \quad (2),$$

wherein:
$L_i$ is the length of the largest dimension in one of the spatial directions of a fraction of the flat glass fibre (B) in the final polyamide composition (P),
$n_i$ is the number of flat glass fibres (B) having the length $L_i$,
n is the total number of flat glass fibres (B),
i is an integer from 1 to ∞, and
d is the length of the shortest dimension in one of the spatial directions of a fraction of the flat glass fibre (B).

In other words, d is preferably equivalent to the length of the secondary cross-sectional axis of the flat glass fibre (B). The length of the secondary cross-sectional axis d and the length of the main cross-sectional axis w of the flat glass fibre (B) is typically determined prior to the compounding step for the preparation of the polyamide composition (P), i.e. d and w are determined in the flat glass fibre (B) used as starting material. Typically, the length of the secondary cross-sectional axis d and the length of the main cross-sectional axis w is determined by the production process of the flat glass fibre (B) and does not substantially change during the compounding process of the polyamide composition (P). The determination of the length of the secondary cross-sectional axis d and the length of the main cross-sectional axis w of a single flat glass fibre (B) may carried out, if necessary, e.g. by image analysis techniques applied to optical microscopy or to scanning electron microscopy (SEM).

$L_n$ is typically in a range from 200 μm to 700 μm and preferably ≥280 μm, more preferably ≥320 μm, and in particular ≥360 μm, and often ≤5.0 mm, preferably ≤1.0 mm. In one embodiment of the invention $L_n$ is >380 μm.

The nature of glasses constituting the flat glass fibres (B) of the polyamide composition (P) of the present invention is not particularly limited and can include E glass, boron free glass, T glass, NE glass, C glass, S glass, S2 glass and R glass, and the like. Flat fibres may contain sizing agents on their surface in order to guarantee their cohesion when in continuous and chopped strand forms, and particularly to provide adhesion at the interface with the polyamide matrix. Particularly preferred are E glass fibres and boron free glass fibres.

Furthermore, the flat glass fibres (B) of the present invention preferably have a length of the main cross-sectional axis w in a range of 6 to 40 μm, in particular of 10 to 30 μm, more preferably of 16 to 28 μm. The length of the secondary cross-sectional axis d is preferably in the range of 1 to 20 μm, in particle in the range of 2 to 10 μm, more preferably of 3 to 8 μm.

According to the teaching of the present invention, the polyamide composition (P) comprises 15 to 75 wt.-%, based on the total weight of the polyamide composition (P), of the at least one flat glass fibre (B). Preferably, the polyamide composition (P) comprises 20 to 70 wt.-%, more preferably 25 to 70 wt.-%, and in particular 30 to 65 wt.-%, based on the total weight of the polyamide composition (P), of the at least one flat glass fibre (B).

It has been found out that the polyamide composition (P) of the present invention should comprise not more than 75 wt.-%, preferably not more than 70 wt.-%, and in particular not more than 65 wt.-% of flat glass fibres (B), based on the total weight of the polyamide composition (P), in order to ensure that the polyamide composition (P) is properly extrudable.

Furthermore, the polyamide composition (P) of the present invention includes at least one reinforcement agent (C) different from the flat glass fibre (B) in an amount of 0 to 30 wt.-% based on the total weight of the polyamide composition (P).

The reinforcement agent (C) includes particulate reinforcement agents (C) such as talc, mica, kaolin, calcium carbonate, calcium silicate, and magnesium carbonate, as well as fibrous reinforcement agents (C) other than the flat glass fibre (B). Suitable fibrous reinforcement agents (C) include carbon fibres, synthetic polymeric fibres, aramid fibres, aluminum fibres, titanium fibres, magnesium fibres, boron carbide fibres, rock wool fibres, steel fibres, wollastonite etc. Further included are glass fibres having a substantially circular cross-section, i.e. an aspect ratio (=length of main cross-sectional axis w/length of the secondary cross-sectional axis d) of said non-circular cross-section of about 0.95:1.05. Preferably, the reinforcement agent (C) is chosen—if present—from fibrous reinforcement agents.

It is preferred that the amount of at least one reinforcement agent (C) present in the polyamide composition (P) of the present invention is from 0 to 15 wt.-%, preferably from 0 to 10 wt.-%, 0 to 5 wt.-%, more preferably 0 to 1 wt.-% based on the to the total weight of the polyamide composition (P). In a particular preferred embodiment, no reinforcement agent (C) is present in the polyamide composition (P).

Moreover, the polyamide composition (P) of the present invention includes at least one additive (D) in an amount of 0 to 30 wt.-% based on the total weight of the polyamide composition (P).

The term "additive" as used herein refers to every compound suitable for the polyamide composition (P) according to the invention, but does not refer to polyamide resins. In particular the additives (D) which may be advantageously used in the polyamide composition (P), include a colorant, a lubricant, a light and/or heat stabilizer, an impact modifier, a flame retardant, a plasticizer, a nucleating agent, a catalyst, an antioxidant, an antistatic agent, a pigment, and any combinations thereof.

It is preferred that the amount of the at least one additive (D) present in the polyamide composition (P) of the present invention is from 0.1 to 5.0 wt.-%, preferably from 0.2 to 3.5 wt.-%, 0.5 to 2.5 wt.-%, more preferably 0.8 to 1.5 wt.-% based on the to the total weight of the polyamide composition (P).

The polyamide composition (P) of the present invention can be produced by any known method for the production of flat glass fibre-reinforced granulate, in particular by means of a twin screw co-rotating extruder. A typical co-rotating twin screw extruder is composed of multiple (typically 10) heating barrel zones, with multiple feeding points, typically in zone 1, 4 and/or 6. A vacuum trapping element is usually placed in zone 7 or 8. Screw dimensions are usually indicated by their L/D ratio, where L means the screw length, and D means the diameter of each screw. For an extruder equipped with 10 heating zones, L/D=40 is a typical screw dimensional ratio.

According to this process, polyamide(s) (A) and additives (C, D) are fed gravimetrically into the first zone of the extruder screws, where a polymer melt is produced and the constituents are homogenized. Flat glass fibers (B), in form of chopped strands, typically with an average length of 3 to 10 mm, preferably 3 to 6 mm, (or optionally in form of continuous roving filaments), are then gravimetrically fed downstreams (i.e. in at least one subsequent zone, typically in zone 6 of the extruder screws), and mixed together with the molten polymer composition. During this mixing process, partial breakage of flat glass fiber (B) occurs, providing a final distribution of lengths of the flat glass fibres (B) dispersed in the polyamide composition (P). The resulting molten polymer composition is then extruded through a die, cooled and pelletized into solid granules with a typical length of 1 to 10 mm. The alternation of conveying and kneading (shearing) elements in the extruded screws configuration, together with processing conditions adopted (such as temperature, throughput, screws speed, etc.) determine the level of dispersion as well as the final length distribution of the flat glass fibers (B) comprised in the polyamide composition (P).

Another suitable production process is pultrusion, in which endless fibre strands (roving) are completely saturated with the polymer melt and subsequently is cooled and cut into granules. In this case the final flat fibers length is equal or close to the length of the granules, which can preferably be from 1 to 10 mm.

The flat fibre-reinforced granulate obtained in these ways, which has preferably a granulate length of 1 to 10 mm, in particular of 2 to 5 mm or more preferably of 2 to 4 mm, can be further processed with common processing methods (such as e.g. extrusion, injection and/or blow molding) to form molded parts, particular good properties of the molded part being achieved with gentle processing methods. Preferably the molded parts are produced by injection molding. In this context, gentle means above all that excessive fibre breakage and the great reduction in fibre length associated therewith is extensively avoided. In injection molding, this means that molding should keep the glass fibre length distribution within the previously indicated distribution range.

A further object of the present invention relates to the use of the polyamide composition (P) for the production of molded parts, wherein the polyamide composition (P) comprises (or consists of):

(a) 25 to 85 wt.-%, preferably 30 to 80 wt.-%, more preferably 30 to 75 wt.-%, and in particular 35 to 70 wt.-%, based on the total weight of the polyamide composition (P), of at least one polyamide (A);

(b) 15 to 75 wt.-%, preferably 20 to 70 wt.-%, more preferably 25 to 70 wt.-%, and in particular 30 to 65 wt.-%, based on the total weight of the polyamide composition (P), of at least one flat glass fibre (B) with elongated shape having a non-circular cross-sectional area;

(c) 0 to 30 wt.-%, based on the total weight of the polyamide composition (P), of at least one reinforcement agent (C) different from the flat glass fibre (B), (d) 0 to 30 wt.-%, based on the total weight of the polyamide composition (P), of at least one additive (D); wherein the at least one polyamide has a viscosity number (VN) in the range of from 80 to 200 mL/g; and the at least one flat glass fibre (B) as comprised in the final polyamide composition (P) is defined by the following parameter:

(i) the aspect ratio of the length of the main cross-sectional axis w to the length of the secondary cross-sectional axis d of the non-circular cross-sectional area of the flat glass fibre (B) is from 1.5 to 10, preferably from >3 to 10;

(ii) the average length $L_z$ of the flat glass fibre (B), defined by the following formula (1), has a minimum value of 400 μm and a maximum value of 700 μm:

$$L_z = \Sigma_{i=1}^{n}(L_i)^3 n_i / \Sigma_{i=1}^{n}(L_i)^2 n_i \quad (1),$$

wherein:

$L_i$ is the length of the largest dimension in one of the spatial directions of a fraction of the flat glass fibre (B) in the final polyamide composition (P), $n_i$ is the number of flat glass fibres (B) having the length $L_i$, n is the total number of flat glass fibres (B), and i is an integer from 1 to ∞; and (iii) the ratio between the average longest dimension $L_n$, defined by the following formula (2), of the flat glass fibre (B) and the average shortest dimension d of the flat glass fibre (B) is $$\frac{L_n}{d} \geq 40:$$

$$L_n = \Sigma_{i=1}^{n} L_i n_i / \Sigma_{i=1}^{n} n_i \quad (2),$$

wherein:

$L_i$ is the length of the largest dimension in one of the spatial directions of a fraction of the flat glass fibre (B) in the final polyamide composition (P), $n_i$ is the number of flat glass fibres (B) having the length $L_i$, n is the total number of flat glass fibres (B), i is an integer from 1 to ∞, and d is the length of the shortest dimension in one of the spatial directions of a fraction of the flat glass fibre (B).

According to the invention, the polyamide composition (P) is used to produce molded parts preferably by injection molding processes, extrusion processes or blow molding processes, in particular by injection molding processes.

According to the present invention, these molded parts are preferably used to produce mechanical parts which require high fatigue resistance properties. In one aspect of the invention, the polyamide composition (P) is used to produce molded parts, wherein the molded parts are submitted to oscillatory loadings of variable amplitude, variable frequency, variable pressure loadings and variable temperature in different moisture conditions during its use. Typical examples include parts close to the engine in automotive applications. Typically, those parts are conveniently prepared from metals in view of the high fatigue resistance that are necessary.

In one aspect of the invention, the molded parts are mechanical parts. Preferably, the molded parts are mechanical parts selected from the group consisting of interior and exterior parts for automobile; parts for power tools including engine parts for lawn and garden applications and parts submitted to high pressure, such as high pressure water cleaners high pressure vapor transport elements; parts for sport and leisure applications, including structural and functional elements in bicycles and motorcycles; parts for liquid supply applications, in particular water meters, water pumps, valves.

The interior and/or exterior parts for automobile are preferably selected from the group consisting of throttle body and throttle body parts, active and standard cooling valves, thermostat housings, oil filter housings, oil modules, cooling circuit elements such as ducts, pumps and cooling circuit pump components, turbo air ducts, charge air coolers, air intake manifolds, wind screen arm, wipers system parts, fuel rail, fuel filter components, door lock mechanism, internal door handle, cylinder head cover, engine mounts, suspension components, seat structure parts, brake pedal, clutch master cylinder and system, pedals and brackets, gear shift, pulleys, timing belt cover, timing chain cover, transmission crossbeam, timing chain tensioner, battery frames and supports for electro vehicles and/or hybrid vehicles.

More preferred applications in automotive are throttle body and throttle body parts, active and standard cooling valves, thermostat housings, oil filter housings, oil modules, water pumps and water pump components, wind screen arm, wipers system parts, door lock mechanism, cylinder head cover, engine mounts, suspension components, brake pedal, clutch master cylinder and system, pedals and brackets, timing belt cover, timing chain cover, transmission crossbeam and timing chain tensioner.

Even more preferred applications in automotive are cooling circuit elements such as ducts, pumps and cooling circuit pump components, turbo air ducts, transmission crossbeams, and battery frames and supports for electro vehicles and/or hybrid vehicles.

A further object of the present invention relates to the use of molded parts obtainable by molding of a polyamide composition (P) to produce mechanical parts, wherein the polyamide composition (P) comprises (or consists of):

(a) 25 to 85 wt.-%, preferably 30 to 80 wt.-%, more preferably 30 to 75 wt.-%, and in particular 35 to 70 wt.-%, based on the total weight of the polyamide composition (P), of at least one polyamide (A);

(b) 15 to 75 wt.-%, preferably 20 to 70 wt.-%, more preferably 25 to 70 wt.-%, and in particular 30 to 65 wt.-%, based on the total weight of the polyamide composition (P), of at least one flat glass fibre (B) with elongated shape having a non-circular cross-sectional area;

(c) 0 to 30 wt.-%, based on the total weight of the polyamide composition (P), of at least one reinforcement agent (C) different from the flat glass fibre (B), (d) 0 to 30 wt.-%, based on the total weight of the polyamide composition (P), of at least one additive (D); wherein the at least one polyamide has a viscosity number (VN) in the range of from 80 to 200 mL/g; and the at least one flat glass fibre (B) as comprised in the final polyamide composition (P) is defined by the following parameter:

(i) the aspect ratio of the length of the main cross-sectional axis w to the length of the secondary cross-sectional axis d of the non-circular cross-sectional area of the flat glass fibre (B) is from 1.5 to 10, preferably from >3 to 10;

(ii) the average length $L_z$ of the flat glass fibre (B), defined by the following formula (1), has a minimum value of 400 μm and a maximum value of 700 μm:

$$L_z = \Sigma_{i=1}^{n}(L_i)^3 n_i / \Sigma_{i=1}^{n}(L_i)^2 n_i \qquad (1),$$

wherein:

$L_i$ is the length of the largest dimension in one of the spatial directions of a fraction of the flat glass fibre (B) in the final polyamide composition (P), $n_i$ is the number of flat glass fibres (B) having the length $L_i$, n is the total number of flat glass fibres (B), and i is an integer from 1 to ∞; and (iii) the ratio between the average longest dimension $L_n$, defined by the following formula (2), of the flat glass fibre (B) and the average shortest dimension d of the flat glass fibre (B) is $$\frac{L_n}{d} \geq 40:$$

$$L_n = \Sigma_{i=1}^{n} L_i n_i / \Sigma_{i=1}^{n} n_i \qquad (2),$$

wherein:

$L_i$ is the length of the largest dimension in one of the spatial directions of a fraction of the flat glass fibre (B) in the final polyamide composition (P), $n_i$ is the number of flat glass fibres (B) having the length $L_i$, n is the total number of flat glass fibres (B), i is an integer from 1 to ∞, and d is the length of the shortest dimension in one of the spatial directions of a fraction of the flat glass fibre (B).

As regards definitions and preferred embodiments of this object, the previously described definitions and embodiments apply without restriction.

A further object of the present invention relates to a polyamide composition (P) comprising (or consisting of):

(a) 25 to 85 wt.-%, based on the total weight of the polyamide composition (P), of polyamide 6.6 (PA 6.6);
(b) 15 to 75 wt.-%, based on the total weight of the polyamide composition (P), of at least one flat glass fibre (B) with elongated shape having a non-circular cross-sectional area;
(c) 0 to 30 wt.-%, based on the total weight of the polyamide composition (P), of at least one reinforcement agent (C) different from the flat glass fibre (B),
(d) 0 to 30 wt.-%, based on the total weight of the polyamide composition (P), of at least one additive (D); wherein the at least one polyamide has a viscosity number (VN) in the range of from 80 to 200 mL/g; and the at least one flat glass fibre (B) as comprised in the final polyamide composition (P) is defined by the following parameter:

(i) the aspect ratio of the length of the main cross-sectional axis w to the length of the secondary cross-sectional axis d of the non-circular cross-sectional area of the flat glass fibre (B) is from 1.5 to 10, preferably from >3 to 10;

(ii) the average length $L_z$ of the flat glass fibre (B), defined by the following formula (1), has a minimum value of 400 μm and a maximum value of 700 μm:

$$L_z = \Sigma_{i=1}^{n}(L_i)^3 n_i / \Sigma_{i=1}^{n}(L_i)^2 n_i \quad (1),$$

wherein:

$L_i$ is the length of the largest dimension in one of the spatial directions of a fraction of the flat glass fibre (B) in the final polyamide composition (P), $n_i$ is the number of flat glass fibres (B) having the length $L_i$, n is the total number of flat glass fibres (B), and i is an integer from 1 to ∞; and (iii) the ratio between the average longest dimension $L_n$, defined by the following formula (2), of the flat glass fibre (B) and the average shortest dimension d of the flat glass fibre (B) is $$\frac{L_n}{d} \geq 40:$$

$$L_n = \Sigma_{i=1}^{n} L_i n_i / \Sigma_{i=1}^{n} n_i \quad (2),$$

wherein:

$L_i$ is the length of the largest dimension in one of the spatial directions of a fraction of the flat glass fibre (B) in the final polyamide composition (P), $n_i$ is the number of flat glass fibres (B) having the length $L_i$, n is the total number of flat glass fibres (B), i is an integer from 1 to ∞, and d is the length of the shortest dimension in one of the spatial directions of a fraction of the flat glass fibre (B).

Concerning the polyamide compositions (P) the previous definitions and preferred embodiments apply accordingly where applicable (i.e. in particular with respect to constituents (B) to (D)).

In a preferred embodiment, the polyamide composition (P) substantially comprises no other polyamide than PA 6.6. This means that at least 95 wt.-%, preferably at least 98 wt.-%, and in particular at least 99 wt.-%, of the entire polyamide (A) consists of PA 6.6 only.

In a further aspect, the invention is concerned with a molded part obtainable by molding a polyamide composition (P) as defined above, comprising (or consisting of):
(a) 25 to 85 wt.-%, based on the total weight of the polyamide composition (P), of polyamide 6.6 (PA 6.6);
(b) 15 to 75 wt.-%, based on the total weight of the polyamide composition (P), of at least one flat glass fibre (B) with elongated shape having a non-circular cross-sectional area;
(c) 0 to 30 wt.-%, based on the total weight of the polyamide composition (P), of at least one reinforcement agent (C) different from the flat glass fibre (B),
(d) 0 to 30 wt.-%, based on the total weight of the polyamide composition (P), of at least one additive (D); wherein the at least one polyamide has a viscosity number (VN) in the range of from 80 to 200 mL/g; and the at least one flat glass fibre (B) as comprised in the final polyamide composition (P) is defined by the following parameter:

(i) the aspect ratio of the length of the main cross-sectional axis w to the length of the secondary cross-sectional axis d of the non-circular cross-sectional area of the flat glass fibre (B) is from 1.5 to 10, preferably from >3 to 10;

(ii) the average length $L_z$ of the flat glass fibre (B), defined by the following formula (1), has a minimum value of 400 μm and a maximum value of 700 μm:

$$L_z = \Sigma_{i=1}^{n}(L_i)^3 n_i / \Sigma_{i=1}^{n}(L_i)^2 n_i \quad (1),$$

wherein:

$L_i$ is the length of the largest dimension in one of the spatial directions of a fraction of the flat glass fibre (B) in the final polyamide composition (P), $n_i$ is the number of flat glass fibres (B) having the length $L_i$, n is the total number of flat glass fibres (B), and i is an integer from 1 to ∞; and (iii) the ratio between the average longest dimension $L_n$, defined by the following formula (2), of the flat glass fibre (B) and the average shortest dimension d of the flat glass fibre (B) is $$\frac{L_n}{d} \geq 40:$$

$$L_n = \Sigma_{i=1}^{n} L_i n_i / \Sigma_{i=1}^{n} n_i \quad (2),$$

wherein:

$L_i$ is the length of the largest dimension in one of the spatial directions of a fraction of the flat glass fibre (B) in the final polyamide composition (P), $n_i$ is the number of flat glass fibres (B) having the length $L_i$, n is the total number of flat glass fibres (B), i is an integer from 1 to ∞, and d is the length of the shortest dimension in one of the spatial directions of a fraction of the flat glass fibre (B).

Other details or advantages of the present invention will become more clearly apparent through the examples given below. The present invention will be elucidated by the following examples, which are intended to demonstrate, but not to restrict, the invention.

Examples

General Methods

The properties of the polyamide compositions (P) according to the inventive and comparative examples as well as the properties of the employed polyamides (A) were determined by using the following measurement methods:

Tensile Strength (DAM) according to ISO 527-4 with dry as molded type 1A specimens;

Tensile Modulus (DAM) according to ISO 527-4 with dry as molded type 1A specimens;

Viscosity number (VN) according to according to ISO 307 as a 0.005 g/ml solution in 90 wt.-% of formic acid at 25° C.

Compounds

The following materials were used in the preparation of examples:

PA 6.6-1 medium viscosity polyamide 6.6 having a viscosity number (VN) of 140 mug (determined according to ISO 307), supplied by Solvay under the trade name of STABAMID 26AE1.

PA 6.6-2 low viscosity polyamide 6.6 having a viscosity number (VN) of 101 ml/g (determined according to ISO 307), supplied by Solvay under the trade name of STABAMID 22FE1.

Std-GF standard cylindrical chopped strand E-glass fibres having a diameter of 10 μm and a fibre length of the chipped glass fibres prior to the processing of 3 mm as obtained from NEG (Nippon Electric Glass) under the trade name 289H.

Figure 5A:
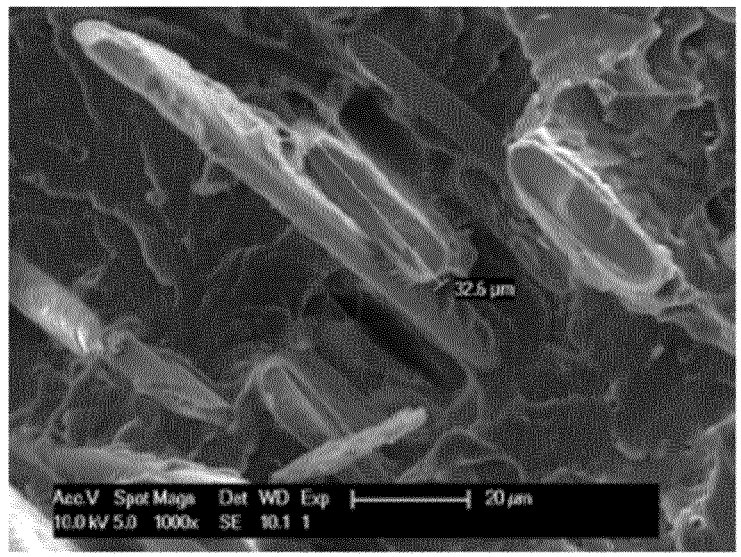
FIG. 5a depicts the cross-sectional area of one flat glass fibre (B). The flat glass fibre (B) have an average length of the main cross-sectional axis w of 28 µm, an average length of the secondary cross-sectional axis d of 7 µm and a resulting aspect ratio of 1:4. These glass fibres were used in the examples (indicated as Flat GF-1).

Flat GF-1 Flat glass fibres (B), in form of 3 mm length chopped strands, having a flat cross-section with measured aspect ratio of 1:4 (secondary cross-section d of 7 μm and main cross-section w of 28 μm) supplied by CPIC (Chongqing Polycomp International Corp.) under the trade name 301HF-3. The shape and section of Flat GF-1 is depicted in FIG. 5a.

Figure 5B:
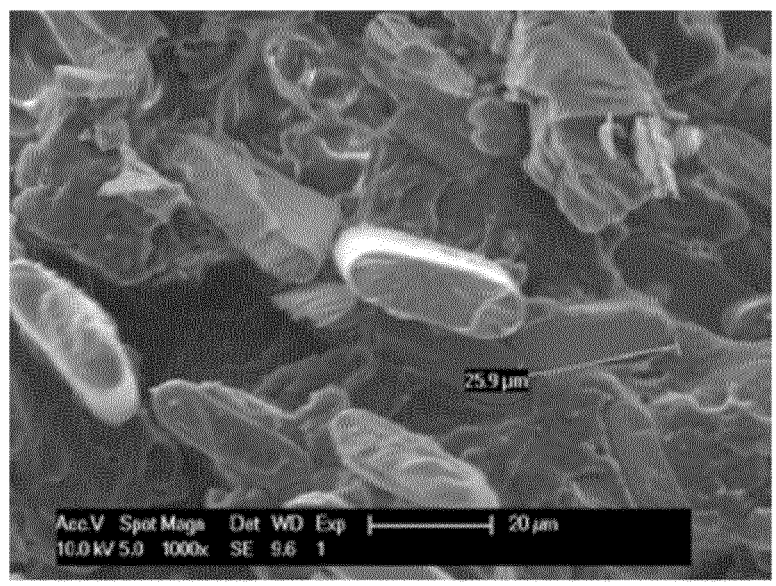
FIG. 5b depicts the cross-sectional area of one alternative flat glass fibre (B). The flat glass fibres (B) have an average length of main cross-sectional axis w of 27 µm, an average length of the secondary cross-sectional axis d of 9 µm and a resulting aspect ratio of 1:3. These glass fibres were used in the examples (indicated as Flat GF-2).

Flat GF-2 Flat glass fibres (B), in form of 3 mm length chopped strands, having a flat cross-section with measured aspect ratio 1:3 (secondary cross-section d of 9 μm and main cross-section w of 27 μm) supplied by Taishan under the trade name T4355. The shape and section of Flat GF-2 is depicted in FIG. 5b.

Additives (D) mixture of stabilizer and lubricant for a better processability.

Polyamide compositions (P) were prepared by compounding the constituents (A) to (D) according to the compositions defined in Table 1. The compounding was made as follows: The constituents (A) to (D) according to the compositions defined in Table 1 were compounded (or "extruded") with a co-rotating twin screw extruder ZSK 26 from Coperion, divided in 10 heating barrels, with a total L/D=40. In all examples, the throughput and the screw speed were set at 30 kg/hr and 300 RPM, respectively. The barrel temperatures were set between 270° C. (in the hopper-barrel 1) and 300° C. (in the die-barrel 10). Temperature settings were the same for all samples.

In all examples, granules of polyamides were fed into the main feeder located in barrel 1. In order to prevent breakage of the glass fibres and to maintain the glass fibre length in optimum range (i.e. $L_z$ between 400 and 700 μm, $L_n/d≥40$), the flat glass fibres were fed through the side feeder at barrel 6, located after screw kneading elements in examples 1 to 4 as well as in the comparative examples. Therefore, the glass fibres only passed through conveying/distribution screw elements to be mixed with the molten polymer composition (further referred to herein as screw profile 1).

In example 5, a kneading element was added after the glass fibre feed, in order to obtain a glass fibre distribution with a shorter number-average fibre length (i.e. $L_z$<400 μm) (further referred to herein as screw profile 2).

The compounded polyamide compositions were extruded to strands which were then cooled in a water bath and chopped into 3 mm long granules (pellets).

TABLE 1

Polyamide compositions used in Examples 1 to 3 and Comparative Examples CE-1 to CE-5.

| Polyamide composition (P) | CE-1 | 1 | CE-2 | 2 | CE-3 | 3 | CE-4 | CE-5 |
|---|---|---|---|---|---|---|---|---|
| PA 6.6-1 (A) | 49 | 49 | — | — | — | — | 49 | 49 |
| PA 6.6-2 (A) | — | — | 49 | 49 | 39 | 39 | — | — |
| STD-GF (C) | 50 | — | 50 | — | 60 | — | — | — |
| Flat-GF-1 (B) | — | 50 | — | 50 | — | 60 | — | 50 |
| Flat-GF-2 (B) | — | — | — | — | — | — | 50 | — |
| Additives (D) | 1 | 1 | 1 | 1 | 1 | 1 | 1 | 1 |
| TOTAL | 100 | 100 | 100 | 100 | 100 | 100 | 100 | 100 |
| Screw profile | 1 | 1 | 1 | 1 | 1 | 1 | 1 | 2 |
| $L_n$ (μm) | 197 | 404 | 189 | 413 | 165 | 380 | 321 | 261 |
| $L_z$ (μm) | 295 | 590 | 315 | 598 | 230 | 571 | 460 | 352 |
| $L_n/d$ | 19.7 | 57.7 | 18.9 | 59 | 16.5 | 54.3 | 35.7 | 37.3 |

Preparation of Sample Plaques

Sample plaques have been prepared from the polyamide compositions (P) according to Examples 1 to 3 and Comparative Examples CE-1 to CE-5

Tests are led on specimens machined from molded plaques. Plaque geometry, gates and runners are defined in FIG. 1. Molding process is defined as follows in Table 2. It has been kept constant for the different materials tested. Molding generates a microstructure where glass fibres are oriented mostly along flow direction, i.e. plaque length.

TABLE 2

Molding process conditions.

| Freezing time (s) | 10 |
|---|---|
| Packing time (s) | 10 |
| Injection time (s) | 3.9 |
| Dosing time (s) | 3.9 |
| Cycle time (s) | 28.5 |
| Injection speed (cm3/s) | 42 |
| Screw speed (tr/min) | 150 |
| Mold temperature (° C.) | 75/85 |
| Barrel temperature (° C.) | 295/300 |

Molded plaques have been machined to produce specimens having different angles between force imposed and average glass fibres orientation. Specimen produced are either longitudinal, with force applied and average orientation parallel, or transverse, with an angle of 90° between force applied and average fibre orientation.

Figure 2:
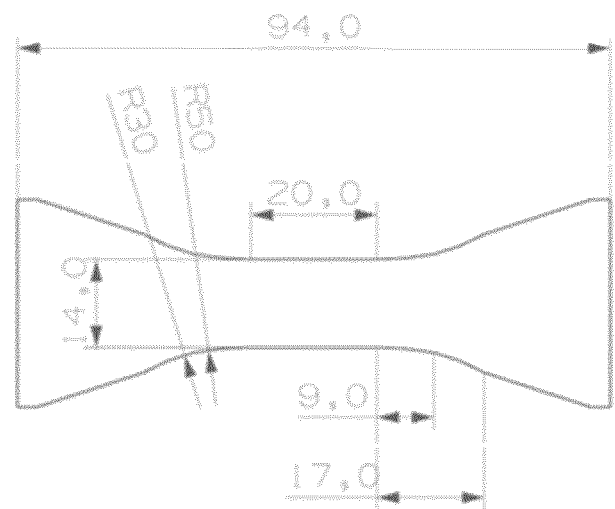
FIG. 2 depicts the shape of the obtained test specimen which were used in the fatigue resistance tests.

Specimen shape is defined by FIG. 2. Most important dimensions are parallel length: 20 mm, specimen width: 14 mm and connecting radius: 50 mm.

Machining locations are defined as follows: specimen symmetry center always belong to plaque symmetry axis. For longitudinal case, two specimens are machined in molded plaques. For transverse case, three specimens are machined. The table 3 gives the position of specimen's symmetry centers as a function of average fibre orientation. Distances are given form plaque gate.

TABLE 3

Position of specimen's symmetry centers.

| Machining angle (°) | Position of symmetry centers (mm) | | |
|---|---|---|---|
| 0 | 108.5 | | 253.5 |
| 90 | 146 | 214 | 280 |

Once machined, specimens are conditioned following ISO 1110 standard at a temperature of 70° C. and a relative hygrometry of 62%, in order to achieve equilibrium moisture content at 23° C. and 50% relative humidity (RH50%).

Fatigue Resistance Tests

Evaluation of the fatigue resistance (NR) is made according to the following Protocol P:

Test frequency is 3 Hertz. Tests are force controlled. Load ratio is R=0.1. Specimens are conditioned in order to be at equilibrium for RH50% conditions. Specimens are solicited at room temperature and RH50% with conditions of forced convection. Fatigue failure is defined by the complete failure of the specimen. A first set of tests has been led with a constant maximum nominal stress for longitudinal specimens and another constant load for transverse specimens. 95 MPa has been chosen for longitudinal specimens and 50 MPa for transverse specimens. Tests have been repeated six to eight times to evaluate accurately the average fatigue resistance. Results of the fatigue resistance ($N_R$) are given in Tables 4 to 8.

TABLE 4

Test results of Example 1 and Comparative Example CE-1.

| Property | Test Norm | CE-1 | 1 | Improvement factor |
|---|---|---|---|---|
| NR 0° @ 90 MPa | Protocol P | 106,000 | 511,600 | 4.8 |
| NR 0° @ 95 MPa | Protocol P | 44,000 | 136,000 | 3.1 |
| NR 0° @ 100 MPa | Protocol P | 19,300 | 51,800 | 2.7 |
| NR 90° @ 45 MPa | Protocol P | 331,000 | 10,050,050 | 30.4 |
| NR 90° @ 50 MPa | Protocol P | 88,000 | 1,680,000 | 19.1 |
| NR 90° @ 55 MPa | Protocol P | 24,500 | 244,500 | 10.0 |
| Tensile modulus (DAM) | ISO 527-4 | 16.5 | 17.0 | 1.03 |
| Tensile strength at break (DAM) | ISO 527-4 | 243 | 245 | 1.01 |

Figure 3:
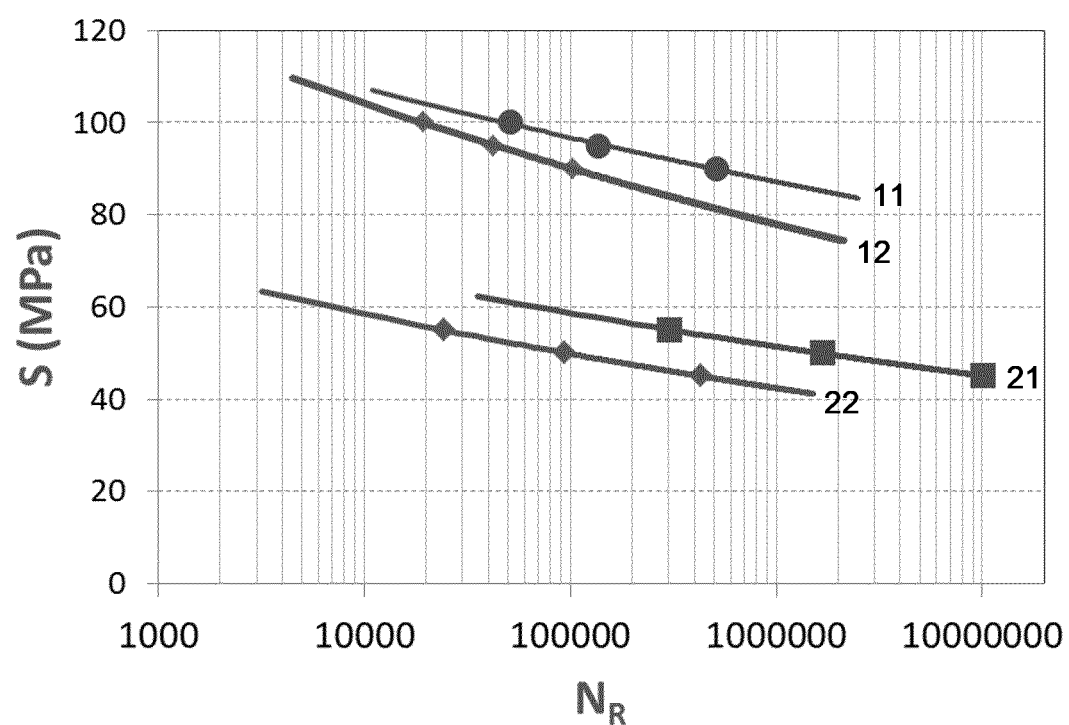
FIG. 3 shows the influence of the flat glass fibres (B) present in the polyamide compositions (P) on fatigue resistance $N_R$ (depicted on the axis of abscissas (x-axis)) at machining angles of 0° (curve 11) and 90° (curve 21) at different testing forces (maximum nominal stress S given in MPa and depicted on the axis of ordinate (y-axis)) compared to polyamide compositions comprising the same amount of standard glass fibres (curves 12 and 22, respectively). Reference is made to Example 1 and Comparative Example 1 according to Table 4. Curve 11 depicts the fatigue resistance $N_R$ of Example 1 according to Table 4 at a machining angel of 0° at 90, 95 and 100 MPa. Curve 12 depicts the fatigue resistance $N_R$ of Comparative Example 1 according to Table 4 at a machining angel of 0° at 90, 95 and 100 MPa. Curve 21 depicts the fatigue resistance $N_R$ of Example 1 according to Table 4 at a machining angel of 90° at 45, 50 and 55 MPa. Curve 22 depicts the fatigue resistance $N_R$ of Comparative Example 1 according to Table 4 at a machining angel of 0° at 45, 50 and 55 MPa.

As can be seen from the comparison of fatigue resistance test results for Example 1 and Comparative Example CE-1, improvements of fatigue resistance are achieved by the addition of flat glass fibres in accordance with the invention compared to standard glass fibres with a factor of 2.7 at a machining angle of 0° at 100 MPa and with a factor of at least 10.0 at a machining angel of 90° at 55 MPa. When smaller test forces here used, even higher improvements of up to a factor of 30.4 were achieved. Tensile modulus and tensile strength are only slightly increased at the same time. The test results of Example 1 and Comparative Example CE-1 are depicted in FIG. 3.

TABLE 5

Test results of Example 2 and Comparative Example CE-2.

| Property | Test Norm | CE-2 | 2 | Improvement factor |
|---|---|---|---|---|
| NR 0° @ 95 MPa | Protocol P | 19,000 | 269,000 | 14.2 |
| NR 90° @ 50 MPa | Protocol P | 32,000 | 440,000 | 13.75 |
| Tensile modulus (DAM) | ISO 527-4 | 16.5 | 17.1 | 1.04 |
| Tensile strength at break (DAM) | ISO 527-4 | 240 | 245 | 1.02 |

As can be seen from the comparison of fatigue resistance test results for Example 2 and Comparative Example CE-2, improvements of fatigue resistance are achieved by the addition of flat glass fibres in accordance with the invention compared to standard glass fibres with a factor of 14.2 at a machining angle of 0° at 95 MPa and with a factor of 13.75 at a machining angel of 90° at 50 MPa. Tensile modulus and tensile strength are only slightly increased at the same time.

TABLE 6

Test results of Example 3 and Comparative Example CE-3.

| Property | Test Norm | CE-3 | 3 | Improvement factor |
|---|---|---|---|---|
| NR 0° @ 95 MPa | Protocol P | 5,000 | 230,000 | 46.0 |
| NR 90° @ 50 MPa | Protocol P | 7,500 | 310,000 | 41.3 |
| Tensile modulus (DAM) | ISO 527-4 | 21.0 | 21.6 | 1.03 |
| Tensile strength at break (DAM) | ISO 527-4 | 242 | 251 | 1.04 |

As can be seen from the comparison of fatigue resistance test results for Example 3 and Comparative Example CE-3, improvements of fatigue resistance are achieved by the addition of flat glass fibres in accordance with the invention compared to standard glass fibres with a factor of 46.0 at a machining angle of 0° at 95 MPa and with a factor of 41.3 at a machining angel of 90° at 50 MPa. Tensile modulus and tensile strength are only slightly increased at the same time.

TABLE 7

Test results of Example 1 and Comparative Example CE-4.

| Property | Test Norm | CE-4 | 1 | Improvement factor |
|---|---|---|---|---|
| NR 0° @ 95 MPa | Protocol P | 51,000 | 136,000 | 2.67 |
| NR 0° @ 100 MPa | Protocol P | 18,500 | 51,800 | 2.8 |
| Tensile modulus (DAM) | ISO 527-4 | 17.3 | 17.0 | 0.98 |
| Tensile strength at break (DAM) | ISO 527-4 | 253 | 245 | 0.97 |

As can be seen from the comparison of fatigue resistance test results for Example 1 and Comparative Example CE-4, improvements of fatigue resistance are achieved by the addition of flat glass fibres in accordance with the invention having a ratio $L_n/d$ of 57.7 (i.e. ≥40) compared to flat glass fibres having a ratio $L_n/d$ of 35.7 (i.e. <40) with an improvement factor of 2.67 at a machining angle of 0° at 95 MPa and with a factor of 2.8 at a machining angel of 0° at 100 MPa. Tensile modulus and tensile strength are substantially unaffected at the same time.

TABLE 8

Test results of Example 1 and Comparative Example CE-5.

| Property | Test Norm | CE-5 | 1 | Improvement factor |
|---|---|---|---|---|
| NR 0° @ 95 MPa | Protocol P | 58,000 | 136,000 | 2.34 |
| NR 0° @ 100 MPa | Protocol P | 31,200 | 51,800 | 1.66 |
| Tensile modulus (DAM) | ISO 527-4 | 17.0 | 17.0 | 1 |
| Tensile strength at break (DAM) | ISO 527-4 | 238 | 245 | 1.03 |

As can be seen from the comparison of fatigue resistance test results for Example 1 and Comparative Example CE-5, improvements of fatigue resistance are achieved by the addition of flat glass fibres in accordance with the invention having a number-average fibre length $L_z$ of 590 μm (i.e. in-between 400 and 700 μm) compared to flat glass fibres having a number-average fibre length $L_z$ of 352 μm (i.e. below 400 μm) with an improvement factor of 2.34 at a machining angle of 0° at 95 MPa and with a factor of 1.66 at a machining angel of 0° at 100 MPa. Tensile modulus and tensile strength are substantially unaffected at the same time.

Tests of fatigue resistance to pulsated pressure of an injection molded part were performed on an injection molded CAC demonstrator part (CAC=Charge Air Cooler) as follows.

Compositions previously reported in Ex-1 (containing 50% wt of flat GF-1) of and CE-1 (containing 50% of Std-GF) respectively, were injection molded in the form of the CAC demonstrator.

Molded parts were jacketed with gaskets and screwed on an aluminum frame in order to assure pressure tightness; then they were put in an oven and tightly connected with a source of pulsating air pressure. Pulsating pressure testing conditions were as follows:
Temperature: 120° C. inside and outside the part;
maximum pressure: 5.5 bars;
minimum pressure 1 bar;
frequency 1.2 Hz
Results are reported in Tab. 9.

TABLE 9

Text results of Example 1 and Comparative Example CE-1

| Property | Units | CAC from EX-1 | CAC from CE-1 |
|---|---|---|---|
| Resistance to pulsating pressure | No. of cycles to breakage | 611690 | 146390 |
| Lz (measured on molded part) | microns | 517 | 253 |
| Ln (measured on molded part) | microns | 312 | 178 |
| Ln/d (measured on molded part) | adimensional | 44 | 17.8 |

The invention claimed is:

1. A polyamide composition (P) for the production of molded parts, wherein the polyamide composition (P) comprises:
   (a) 25 to 85 wt.-%, based on the total weight of the polyamide composition (P), of polyamide (A);
   (b) 15 to 75 wt.-%, based on the total weight of the polyamide composition (P), of at least one flat glass fibre (B) with elongated shape having a non-circular cross-sectional area;
   (c) 0 to 30 wt.-%, based on the total weight of the polyamide composition (P), of at least one reinforcement agent (C) different from the flat glass fibre (B),
   (d) 0 to 30 wt.-%, based on the total weight of the polyamide composition (P), of at least one additive (D);
wherein
the at least one polyamide has a viscosity number (VN), measured according to ISO 307 in a 0.005 g/ml solution in 90 wt.-% formic acid at 25° C., in a range of from 80 to 200 mL/g;
the at least one flat glass fibre (B) as comprised in the polyamide composition (P) is defined by the following parameter:
   (i) an aspect ratio of the length of a main cross-sectional axis w to the length of a secondary cross-sectional axis d of the non-circular cross-sectional area of the flat glass fibre (B) is from >3 to 10;
   (ii) an average length $L_z$ of the flat glass fibre (B), defined by the following formula (1), has a minimum value of 400 μm and a maximum value of 700 μm:

$$L_z = \Sigma_{i=1}^{n}(L_i)^3 n_i / \Sigma_{i=1}^{n}(L_i)^2 n_i \qquad (1),$$

wherein:
$L_i$ is the length of the largest dimension in one of the spatial directions of a fraction of the flat glass fibre (B) in the polyamide composition (P),
$n_i$ is the number of flat glass fibres (B) having the length $L_i$,
n is the total number of flat glass fibres (B), and
i is an integer from 1 to ∞; and
   (iii) a ratio between an average longest dimension $L_n$, defined by the following formula (2), of the flat glass fibre (B) and a shortest average dimension d of the flat glass fibre (B) is $$\frac{L_n}{d} \geq 40:$$

$$L_n = \Sigma_{i=1}^{n} L_i n_i / \Sigma_{i=1}^{n} n_i \qquad (2),$$

wherein:
$L_i$ is the length of the largest dimension in one of the spatial directions of a fraction of the flat glass fibre (B) in the polyamide composition (P),
$n_i$ is the number of flat glass fibres (B) having the length $L_i$,
n is the total number of flat glass fibres (B),
i is an integer from 1 to ∞, and
d is the length of the shortest dimension in one of the spatial directions of a fraction of the flat glass fibre (B); and
wherein the polyamide composition (P) comprises no other polyamide than PA 6.6.

2. The polyamide composition (P) according to claim 1, wherein the average length $L_z$ of the flat glass fibre (B), defined by the formula (1), has a minimum value of 450 μm and a maximum value of 650 μm.

3. The polyamide composition (P) according to claim 1, wherein a ratio between the average longest dimension $L_n$, defined by the formula (2), of the flat glass fibre (B) and the average shortest dimension d of the flat glass fibre (B) $L_n/d$ is between 45 and 700.

4. The polyamide composition (P) according to claim 1, wherein an aspect ratio of the length of the main cross-sectional axis w to the length of the secondary cross-sectional axis d is from 3.5 to 7.

5. The polyamide composition (P) according to claim 1, wherein the flat glass fibres (B) have a length of the main cross-sectional axis w in a range of 16 to 28 μm, and a length of the secondary cross-sectional axis d in a range of 3 to 8 μm.

6. A method of using the polyamide composition (P) according to claim 1, the method comprising using the polyamide composition for the production of molded parts.

7. The method according to claim 6, wherein the molded parts exhibit high fatigue resistance properties.

8. The method according to claim 6, wherein the molded parts are submitted to oscillatory loadings of variable amplitude, variable frequency, variable pressure loadings, or variable temperature in different moisture conditions during its use.

9. The method according to claim 6, wherein the molded parts are produced by injection molding processes, extrusion processes or blow molding processes.

10. The method according to claim 6, wherein the polyamide (A) is an aliphatic, partly crystalline polyamide.

11. The method according to claim 6, wherein the molded parts are mechanical parts selected from the group consisting of interior and exterior parts for automobile, parts for power tools, parts submitted to high pressure, parts for sport and leisure applications, and parts for liquid supply applications.

12. The method according to claim 11, wherein interior and/or exterior parts for automobile are selected from the group consisting of throttle body and throttle body parts, active and standard cooling valves, thermostat housings, oil filter housings, oil modules, cooling circuit elements, turbo air ducts, charge air coolers, air intake manifolds, wind screen arm, wipers system parts, fuel rail, fuel filter components, door lock mechanism, internal door handle, cylinder head cover, engine mounts, suspension components, seat structure parts, brake pedal, clutch master cylinder and system, pedals and brackets, gear shift, pulleys, timing belt cover, timing chain cover, transmission crossbeam, timing chain tensioner, battery frames and supports for electro vehicles and hybrid vehicles.

13. A method of using molded parts obtainable by molding of the polyamide composition (P) according to claim 1, the method comprising using the molded parts to produce mechanical parts.

14. A molded part obtainable by molding the polyamide composition (P) according to claim 1.

* * * * *